Patented Jan. 10, 1933

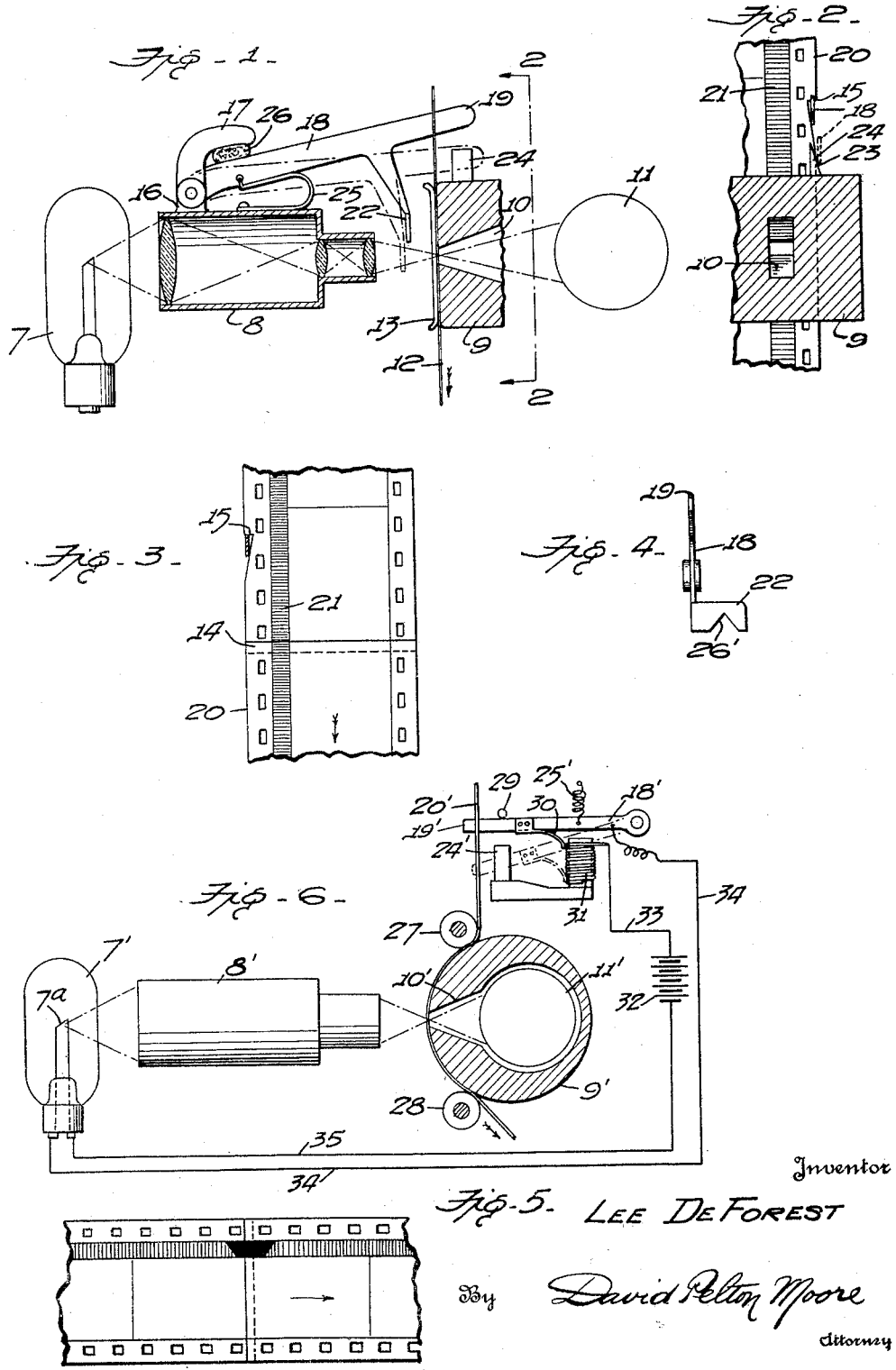

1,894,024

UNITED STATES PATENT OFFICE

LEE DE FOREST, OF NEW YORK, N. Y., ASSIGNOR TO GENERAL TALKING PICTURES CORPORATION, OF NEW YORK, N. Y., A CORPORATION OF DELAWARE

PHOTOGRAPHIC SOUND REPRODUCING APPARATUS

Application filed October 23, 1930. Serial No. 490,761.

The present invention relates to improvements in photographic sound reproducing apparatus, one object of the invention being the provision of means for the elimination of noise due to the passage of a splice in the film across the beam of light in said sound reproducing attachment.

Another object of this invention is the provision of a device adapted to be mounted in the sound head of a photographic sound reproducing mechanism and carried by the film, whereby when the splice passes the beam the amplifying system will be gradually silenced, the means carried by the film being formed coincidentally with the splicing of the film and providing a much simpler arrangement than that now used, namely, blackening of the sound track adjacent the splice.

It has been found in practise if the speed of cutting off and admitting the light is of the order of from 10 to 20 cycles per second, no sound therefrom is heard in the loud speaker and it is therefore the intention to reduce the silencing period to this order, that is, so that a slow interrupting and restoring of the light beam will have no perceptible effect upon the loud speaker and a permanent method for producing this effect is provided in conjunction with the film.

With the foregoing and other objects in view, which will appear as the description proceeds, the invention resides in the combination and arrangements of parts and in the details of construction hereinafter described and claimed, it being understood that changes in the precise embodiment of the invention herein disclosed can be made within the scope of what is claimed without departing from the spirit of the invention.

In the accompanying drawing:—

Figure 1 is a diagrammatic view showing the preferred form of the present invention with the parts in their normal position.

Figure 2 is a cross section taken on line 2—2 of Figure 1.

Figure 3 is a detailed plan view of a motion picture film positive showing a splice and the present adjacent operating mechanism.

Figure 4 is a detailed view of the free end of the doffer or shutter.

Figure 5 is a similar view to Figure 3 of the film showing the present method of producing a silencing effect due to the passage of the splice.

Figure 6 is a view similar to Figure 1 of a modified form of the present invention.

Referring to the drawing and more particularly to Figures 1 through 4, the numeral 7 designates an exciter lamp and 8 an optical system of a photographic sound reproducing apparatus. A slit unit 9 is also provided and has an aperture 10 which directs the beam of light originating at the exciter lamp and directed through the optical system upon the photo electric cell 11 all of usual construction. A film 12 is adapted to be continuously moved past the aperture 10 and is held against the slit unit 9 by means of a presser foot device 13 and where the film is provided with a splice 14 at a predetermined distance in the rear thereof and upon the edge thereof is provided a recess or notch 15. This notch 15 is formed coincidentally with the making of the splice 14 so that it will always be at the proper distance from the splice.

As shown in Figure 1, there is carried by the optical system a support 16 having a hooked terminal 7 and to this support is fulcrumed a lever 18, the extreme terminal 19 of which is projected into the path to contact the edge 20 of the film and have a normal tension toward the sound track 21 so that when the notch 15 approaches and engages the terminal 19 the lever 18 will be depressed or moved downwardly so as to place the shutter or doffer 22 in the path of the beam of light emerging from the optical system. The continued movement of the terminal 18 downwardly bringing the same into contact with the cam surface 23 of the projection 24 carried by the slit unit 17 so that the terminal 19 and the lever is removed from the recess 15 of the film and the lever is free to the action of its spring 25 so as to be moved to the full line position as shown in Figure 2 and against the sponge rubber cushion 26 or to normal re-set position.

Thus it will be seen that when the splice 14 in the film is about to traverse the light path the free end 19 of the lever 18 will be properly engaged by the film and the lever depressed against the action of its spring 25 across the beam of light to be interrupted as the splice is passing the path of such beam, same being so constructed and proportioned that the cutting off and admitting of the beam of light is of the order of from 10 to 20 cycles per second.

The shutter or doffer 22, as clearly shown in Figure 4, is provided with an inverted V shaped notch 26 which is provided so as to produce a gradual cutting off of the beam of light as the shutter is forced downwardly due to the movement of the film.

In order that the present invention may be applied electrically instead of mechanically as illustrated in Figure 1, there has been illustrated in Figure 6 a full electric type in which the beam is interrupted by affecting the light source or exciter lamp 7′, the film 20′ in this instance being constructed similarly as previously described in Figure 3.

In this instance the slit block 9′ has the film 20′ guided thereover and held in contact therewith through the instrumentalities of the rollers 27 and 28, the photoelectric cell 11 being mounted within the slit block opposite the aperture 10′ while disposed in fixed relative position to the slit block is a lever 18′ whose terminal 19′ is constructed similarly to the terminal 19 of the lever 18 previously described and is normally held upwardly by means of the spring 25′ against a stop 29. Connected to and insulated from the lever 18′ is a contact arm 30 disposed to ride upon the contacts of the rheostat 31.

Thus when the recess 15 of the film engages the terminal 19′ of the lever 18′ the contact arm 30 is moved downwardly and greater electrical resistance is thrown into the circuit including the filament 7a of the exciter lamp 7′ so that the filament momentarily is dimmed and thus the beam of light affected, a releasing cam 24′ being provided in the light path to release the lever as in the previous construction.

As here shown a source 32 of electricity is connected through a conductor 33 to the rheostat 31 while the contact arm 30 has connected thereto a conductor 34 which leads to the exciter lamp, a return conductor 35 leading from the lamp to the opposite side of the source 32. This is merely shown as one method of supplying current to the lamp and is indicative of any other means that may be found desirable.

It will thus be seen that when the lever 18′ is depressed, the rheostat's resistance is increased in the circuit thus dimming gradually the light from the exciter lamp, the release of the lever by the cam 24′ permitting the spring 25′ to operate the rheostat in the opposite direction so that the light is thereby progressively brightened until normal brilliancy.

From the foregoing description taken in connection with the drawing, it is evident that with a device of this character that the crude and impractical method of blackening the sound track as shown in Figure 5 is dispensed with and a more permanent means such as the formation of the notch 15 is provided and that by this particular construction a better gradual reduction and increasing of the light beams effect upon the photoelectric cell is provided so that there is no undesirable loud speaker noise produced when the splice intercepts the beam.

What I claim is:

1. The combination with an exciter lamp, an optical system, a film guiding means against and through which the beam of light from the lamp is projected, and a film carrying a sound track and provided with a splice, said film being provided with a notch on one edge of the film a predetermined distance from the splice, and resilient means normally engaging the edge of the film and to be engaged by the notch to be depressed, and means controlled by the latter means whereby the effect of the light beam upon the splice is affected to gradually decrease and increase the beam effect from the lamp.

2. The combination with an exciter lamp, an optical system, a film guiding means against and through which the beam of light from the lamp is projected, and a film carrying a sound track and provided with a splice, of co-operative means carried by the film and in the path thereof for producing a gradually decreasing and increasing beam effect as the splice intercepts the beam in which the co-operative means includes a notch forming an operating shoulder upon one edge of the film, a spring biased lever normally contacting the edge of the film and when engaged by the notch to be moved against its bias, and means directly controlled by the lever for causing the beams of light from the lamp to be gradually decreased and increased during the period that the splice intercepts the beam.

3. The combination with an exciter lamp, an optical system, a film guiding means against and through which the beam of light from the lamp is projected, and a film carrying a sound track and provided with a splice, of co-operative means carried by the film and in the path thereof for producing a gradually decreasing and increasing beam effect as the splice intercepts the beam in which the cooperative means includes a notch forming an operating shoulder upon one edge of the film, a spring biased lever normally contacting the edge of the film and when engaged by the notch to be moved against its bias, and a doffer carried by the lever and moved thereby to and fro across the beam to produce a gradually decreased and increased beam effect.

In testimony whereof I affix my signature.

LEE DE FOREST.